(12) United States Patent
Rahkala et al.

(10) Patent No.: US 10,333,830 B2
(45) Date of Patent: Jun. 25, 2019

(54) PASSIVE ROUTING IN MESH NETWORK

(71) Applicant: Robotonchip Oy, Espoo (FI)

(72) Inventors: Jari Rahkala, Espoo (FI); Marko Lamminaho, Espoo (FI)

(73) Assignee: ROBOTONCHIP OY, Espoo (FI)

( * ) Notice: Subject to any disclaimer, the term of this patent is extended or adjusted under 35 U.S.C. 154(b) by 0 days.

(21) Appl. No.: 15/944,971

(22) Filed: Apr. 4, 2018

(65) Prior Publication Data

US 2018/0351850 A1    Dec. 6, 2018

(30) Foreign Application Priority Data

May 31, 2017  (FI) ....................................... 20175492

(51) Int. Cl.
| | | |
|---|---|---|
| H04W 40/22 | (2009.01) | |
| H04W 40/24 | (2009.01) | |
| H04L 12/705 | (2013.01) | |
| H04L 12/741 | (2013.01) | |
| H04L 12/861 | (2013.01) | |
| H04L 12/733 | (2013.01) | |
| H04L 12/721 | (2013.01) | |

(52) U.S. Cl.
CPC .............. *H04L 45/18* (2013.01); *H04L 45/74* (2013.01); *H04L 49/9031* (2013.01); *H04W 40/22* (2013.01); *H04L 45/20* (2013.01); *H04L 45/32* (2013.01); *H04W 40/24* (2013.01)

(58) Field of Classification Search
CPC ...... H04L 45/18; H04L 45/74; H04L 49/9031
See application file for complete search history.

(56) References Cited

U.S. PATENT DOCUMENTS

| | | | |
|---|---|---|---|
| 8,738,013 B2 * | 5/2014 | Banerjea | ................ H04L 45/26 455/445 |
| 2002/0035554 A1 | 3/2002 | Katsuno et al. | |

(Continued)

FOREIGN PATENT DOCUMENTS

| | | |
|---|---|---|
| GB | 2425688 B | 7/2009 |
| WO | 2006121630 A2 | 11/2006 |
| WO | 2008157662 A1 | 12/2008 |

OTHER PUBLICATIONS

Search Report; FI Patent Application No. 20175492; Finnish Patent and Registration Office; dated Sep. 18, 2017.

(Continued)

*Primary Examiner* — Charles C Jiang
*Assistant Examiner* — Ryan C Kavleski
(74) *Attorney, Agent, or Firm* — Ziegler IP Law Group, LLC

(57) ABSTRACT

According to an example aspect of the disclosed embodiments, there is provided passive routing in a mesh network. One or more media frames from source nodes to target nodes in the mesh network are received. Routing information from a received media frame is derived, said routing information including a source node identifier, a target node identifier, a last node identifier and a frame identifier. The derived routing information is stored into a route ring buffer. A reverse route for the received media frame is determined. The received media frame is prevented from being forwarded in the mesh network, when the route ring buffer includes routing information corresponding to the reverse route.

12 Claims, 10 Drawing Sheets

(56) References Cited

U.S. PATENT DOCUMENTS

| | | | | |
|---|---|---|---|---|
| 2009/0135824 A1* | 5/2009 | Liu | ............... | H04L 45/02 |
| | | | | 370/392 |
| 2010/0118750 A1 | 5/2010 | Iwasa | | |
| 2011/0216696 A1 | 9/2011 | Lippolis et al. | | |
| 2013/0242929 A1* | 9/2013 | Gorgen | ............ | H04L 45/36 |
| | | | | 370/329 |
| 2015/0117454 A1* | 4/2015 | Koponen | ............ | H04L 61/2532 |
| | | | | 370/392 |
| 2015/0139034 A1* | 5/2015 | Kang | ............ | H04L 45/20 |
| | | | | 370/254 |
| 2016/0323012 A1* | 11/2016 | Kwon | ............ | H04B 1/7143 |
| 2017/0171064 A1* | 6/2017 | Alexandru | ............ | H04L 45/32 |

OTHER PUBLICATIONS

Finnish Patent and Registration Office, Communication of Acceptance under section 29a of Patents Decree, dated Jan. 9, 2018, 3 pages.

Yamamoto, Takayuki et al., "Performance Improvement of an Ad Hoc Network System for Wireless Data Service", IEICE Transactions on Communications, vol. E86-B., No. 12, Dec. 2003, pp. 3559-3568.

Extended European Search Report received for European Patent Application No. EP18174978.9, dated Oct. 9, 2018, 3 pages.

\* cited by examiner

PASSIVE ROUTING IN MESH NETWORK

FIELD

The aspects of the embodiments of the present disclosure relate to passive routing in a mesh network.

BACKGROUND

US20110216696A1 discloses a method of transmitting message data from a source node to a destination node in a mesh network, wherein the message data comprises an identifier of the source node, an identifier of the destination node, a transmission route and a message for the destination node. The message data is received by multiple intermediate nodes between the source node and the destination node. One of the intermediate nodes is determined based on a predetermined condition to transmit the message data. The message data is received by the destination node after passing through the intermediate nodes. Information of neighboring nodes is merged and updated by utilizing a knowledge base in an effort to minimize network traffic while simultaneously obtaining up-to-date mesh network nodes' information. A node list is suggested for modifying the mesh network and determining a faster path in order to avoid mesh network congestion.

Maintaining node lists and knowledge base requires a lot of resources particularly in large networks for example of 50000 network nodes. Accordingly, when the number of nodes in the network increases also the work load and memory resources needed for maintaining the node lists and knowledge base is increased.

SUMMARY

The embodiments disclosed are defined by the features of the independent claims. Some specific embodiments are defined in the dependent claims.

According to a first aspect of the present disclosure, there is provided a method for passive routing in a mesh network, the method comprising:
  receiving, by a node of the mesh network, one or more media frames from source nodes to target nodes in the mesh network;
  deriving, by the node of the mesh network, routing information from a received media frame, said routing information comprising a source node identifier, a target node identifier, a last node identifier and a frame identifier;
  storing, by the node of the mesh network, the derived routing information into a route ring buffer;
  determining, by the node of the mesh network, a reverse route for the received media frame;
  preventing the received media frame from being forwarded in the mesh network, when the route ring buffer comprises routing information corresponding to the reverse route.

According to a second aspect of the present disclosure, there is provided an apparatus comprising at least one processing core, at least one memory including computer program code, the at least one memory and the computer program code being configured to, with the at least one processing core, cause the apparatus at least to perform a method according to an aspect.

According to a third aspect of the present disclosure, there is provided a computer program configured to cause a method in accordance with at least one aspect to be performed.

According to a fourth aspect of the present disclosure, there is provided a non-transitory computer readable medium having stored thereon a set of computer readable instructions that, when executed by at least one processor, cause a node of the mesh network to at least:
  receive, by the node of the mesh network, one or more media frames from source nodes to target nodes in the mesh network;
  derive, by the node of the mesh network, routing information from a received media frame, said routing information comprising a source node identifier, a target node identifier, a last node identifier and a frame identifier;
  store, by the node of the mesh network, the derived routing information into a route ring buffer;
  determine, by the node of the mesh network, a reverse route for the received media frame;
  prevent the received media frame from being forwarded in the mesh network, when the route ring buffer comprises routing information corresponding to the reverse route.

EMBODIMENTS

In connection with passive routing in mesh network, a node of the mesh network receives one or more media frames from source nodes to target nodes in the mesh network. The node may derive routing information from received media frame, said routing information comprising a source node identifier, a target node identifier, a last node identifier and a frame identifier. The derived routing information may be stored to a route ring buffer and a reverse route for the received media frame may be determined. The received media frame is prevented from being forwarded in the mesh network, when the route ring buffer comprises routing information corresponding to the reverse route. In this way the route ring buffer may be updated in selected nodes of the mesh network and traffic load caused by forwarding of the media frames may be controlled.

Figure 1:
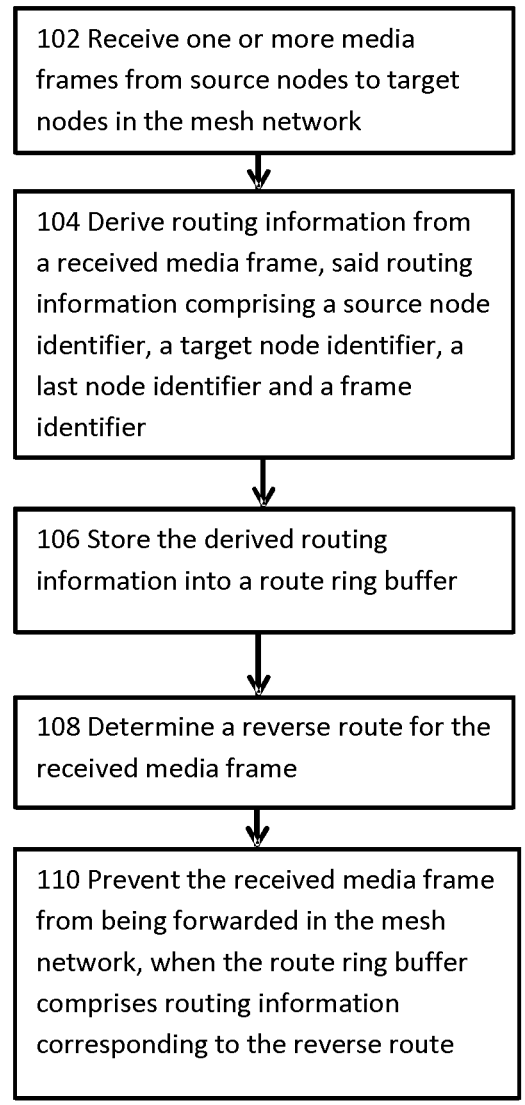
FIG. 1 illustrates a method in accordance with at least some embodiments of the present disclosure.

FIG. 1 illustrates a method in accordance with at least some embodiments of the present disclosure. The method provides passive routing in a mesh network. Phase 102 comprises receiving, by a node of the mesh network, one or more media frames from source nodes to target nodes in the mesh network. Phase 104 comprises deriving, by the node of the mesh network, routing information from a received media frame, said routing information comprising a source node identifier, a target node identifier, a last node identifier and a frame identifier. Phase 106 comprises storing, by the node of the mesh network, the derived routing information into a route ring buffer. Phase 108 comprises determining, by the node of the mesh network, a reverse route for the received media frame. Phase 110 comprises preventing the received media frame from being forwarded in the mesh network, when the route ring buffer comprises routing information corresponding to the reverse route. Accordingly, the reverse route serving as the condition for preventing the forwarding of the frame does not have to be stored in the route ring buffer. The received media frame may be used to update the route ring buffer in one or more intermediary nodes such that media frames may be routed from source nodes to target nodes by the intermediary nodes. Since the forwarding of the media frame is prevented, updating of the route ring buffers in the nodes of the mesh network may be controlled such that route ring buffers may be kept updated in nodes that have received the media frame. Accordingly, forwarding of the media frame may select the route ring buffers of nodes capable of receiving the media frame to be updated. On the other hand, preventing the forwarding of the media frame may select that route ring buffers of nodes capable of receiving the media frame are not updated. It should be appreciated that preventing a received frame from being forwarded may be achieved for example by ignoring or omitting the forwarding operation or at least part of the forwarding operation.

Figure 2:
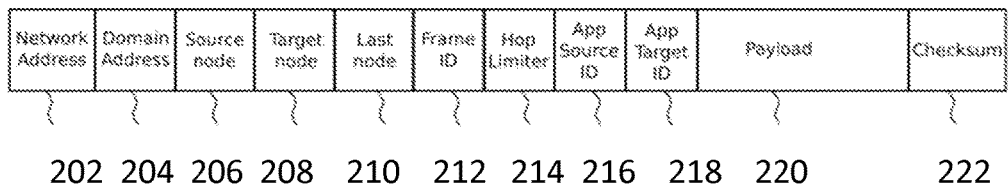
FIG. 2 illustrates a media frame in accordance with at least some embodiments of the present disclosure.

FIG. 2 illustrates a media frame in accordance with at least some embodiments of the present disclosure. The media frame may comprise the following fields: a network address 202, a domain address 204, a source node identifier 206, a target node identifier 208, a last node identifier 210, a frame identifier 212, a hop limiter 214, a service source identifier 216, a service target identifier 218, payload 220 and checksum 222. The media frame may be processed by more than one protocols. The protocols may comprise a link layer protocol, a network layer protocol, a service layer protocol for example. Accordingly, at least some of the fields may be adapted to be processed by more than one protocol. A protocol stack may comprise protocols on a plurality of layers of the protocol stack for processing the media frame. For example, a protocol layer of the protocol stack may comprise a protocol for processing the media frame.

The hop limiter 212 may serve for indicating a maximum time to live (TTL) of the media frame. The TTL may be indicated by a number of hops. A connection between nodes of the mesh network may determine a single hop, whereby a transmission of the frame over a connection between nodes in the mesh network may cause an update of the hop limiter. Initially the hop limiter may be set to a maximum number of hops, whereby a hop may reduce the value of the hop limiter.

The network address 202 may serve for indicating different mesh networks from each other. Media frames cannot pass through different networks than the network address indicates.

The service source identifier 216 may serve for identifying a source application (App) and a service target identifier 218 may serve for identifying a target application.

The payload 220 may serve for carrying data from a source node to a target node in the mesh network.

The domain address 204, source node identifier 206, target node identifier 208 and last node identifier 210 may indicate identifiers of the nodes. The identifiers may be unique in the mesh network. The identifiers may be used for addressing nodes within the mesh network. The domain address may serve for identifying a domain of the mesh network, whereby the identifiers may be unique within the domain. Formats of the identifiers and the domain address may be human-readable but also machine-readable data formats, for example Internet Protocol addresses or Medium Access Control (MAC) addresses are feasible. Identifiers of human-readable formats may be naturally read by humans, for example text in a selected character set for example ASCII character set. The text may represent for example people names. The identifiers may be defined by user according to a desired logic. It should be appreciated that only a specific user may be authorized to manage node identifiers. The user authorized to manage node identifiers may be an administrator of the node and/or administrator of the mesh network.

The checksum 222 may serve for detecting errors in the media frame.

The media frame may be a digital data transmission unit suitable for computer networking and telecommunication. The frame encapsulates data in the payload to be transmitted on a physical layer. Preferably the media frame is not limited to a digital data transmission unit of a single protocol or a protocols layer. Indeed the media frame may serve for a digital data transmission unit of a plurality of protocols that are on different layers. Accordingly, the fields of the media frame may be utilized by more than one protocol on different protocol layers. In one example the source node identifier may be utilized on both link layer and a network layer.

Figure 3A:
FIG. 3a illustrates a reception ring buffer in accordance with at least some embodiments of the present disclosure.

FIG. 3a illustrates a reception ring buffer in accordance with at least some embodiments of the present disclosure. The reception ring buffer may be capable of storing information obtained from received media frames. The information obtained from the received frames may comprise a source node identifier 301, a domain identifier 302, a frame identifier 303. The information stored in the reception ring buffer may serve for performing duplicate media frame detection for the received media frames. In this way only media frames that have not been detected as duplicates may be utilized in updating a route ring buffer.

Figure 3B:
FIG. 3b illustrates a route ring buffer in accordance with at least some embodiments of the present disclosure.

FIG. 3b illustrates a route ring buffer in accordance with at least some embodiments of the present disclosure. The route ring buffer may be capable of storing information obtained from received media frames after duplicate detection. The information obtained from the received frames may comprise a source node identifier 311, a target node identifier 312, a last node identifier 313, a domain identifier 314 and a frame identifier 315. In this way the route ring buffer comprises information for determining whether a received frame should be forwarded or prevented from being forwarded in the mesh network.

A frame identifier may serve for uniquely identifying a frame. Accordingly, copies of the same frame may be identified on the basis of the frame identifier, whereby any copy received after a first instance of the frame may be deleted to prevent handling/forwarding of duplicate frames.

In an embodiment, duplicate media frame detection information stored in the reception ring buffer is utilized to determine whether a received media frame is a duplicate. If the received media frame is a duplicate, the received media frame is deleted without updating the route ring buffer.

Figure 4:
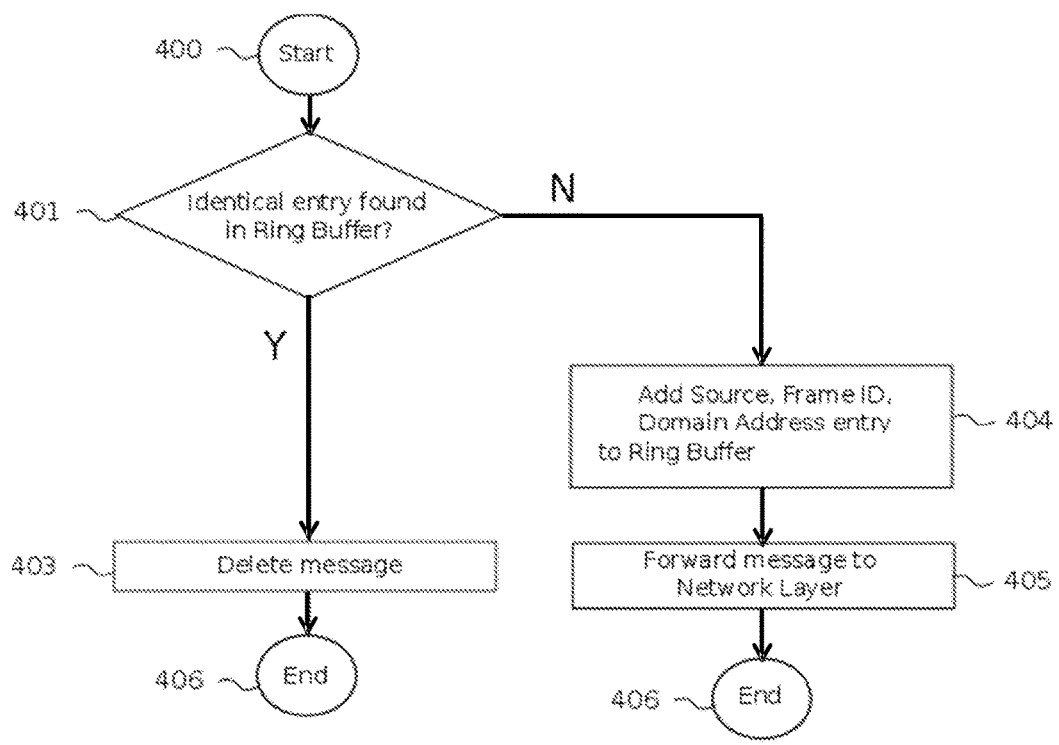
FIGS. 4 and 5 illustrate methods for receiving a media frame in accordance with at least some embodiments of the present disclosure.
Figure 5:
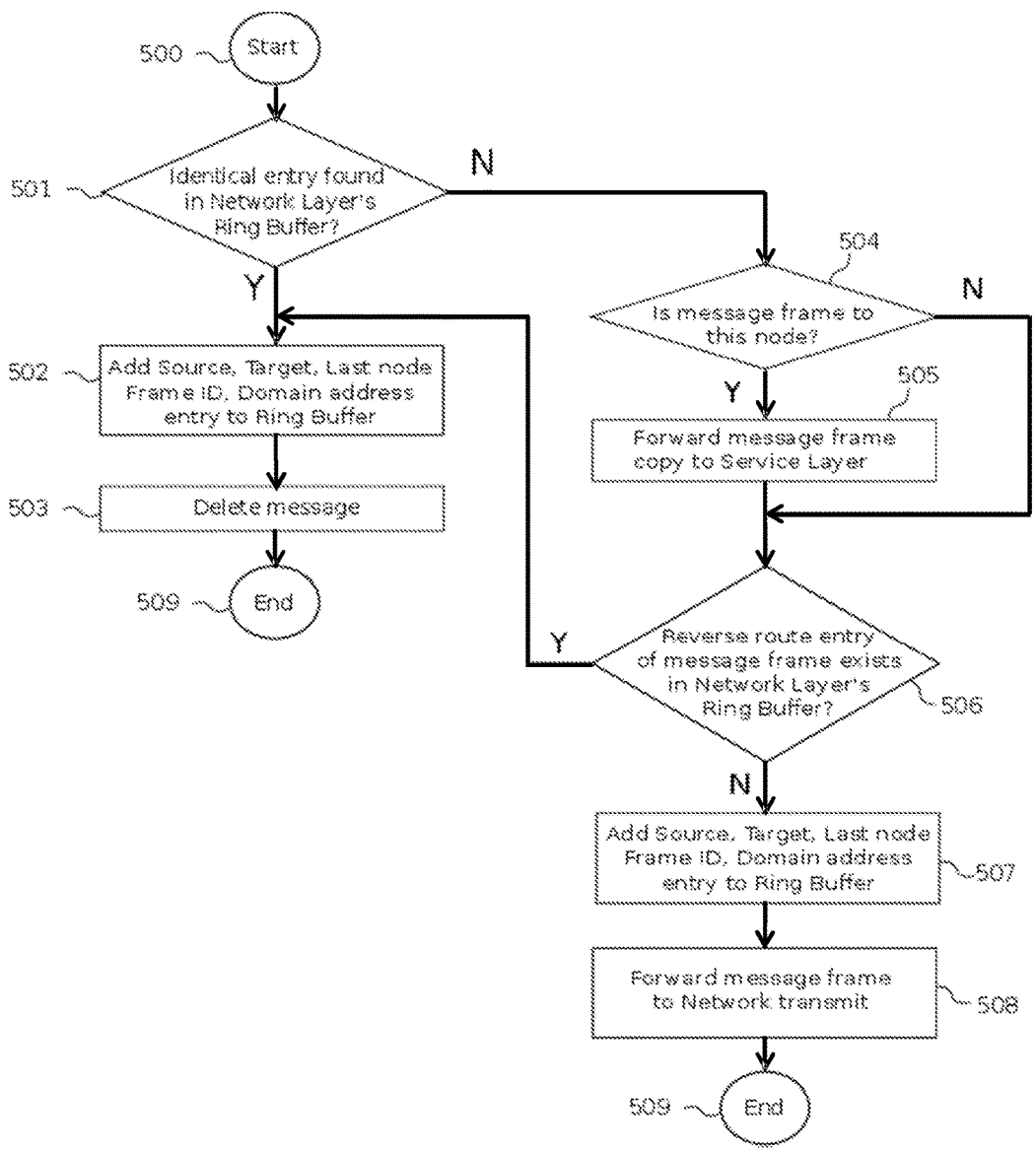

FIGS. 4 and 5 illustrate methods for receiving a media frame in accordance with at least some embodiments of the present disclosure. Referring to FIG. 4, the method may start 400 when a network node has received one or more frames in a mesh network. An entry corresponding to a received frame may be searched in the reception ring buffer. Duplicate media frame detection information comprising one or more of: a source node identifier, a domain identifier, a frame identifier may be derived from the received frame for searching the reception ring buffer. If 401 an entry corresponding to the received frame is found, it may be determined that the received frame is a duplicate of a frame that has been received earlier. Accordingly, in this way the received frame may be identified as duplicate frame. The received frame is deleted 403, whereby the received frame may be prevented from being processed further and forwarded in the mesh network. If 401 an entry corresponding to the received frame is not found, the duplicate media frame detection information may be stored 404 to the reception ring buffer, for example by adding the duplicate media frame detection information to the reception ring buffer, and the received media frame may be forwarded 405 to be processed utilizing a route ring buffer, for example according to the method of FIG. 5. The processing utilizing the reception ring buffer may end 406 after the received media frame has been forwarded or deleted.

Referring to FIG. 5, the method may start 500 when a network node has received a media frame in a mesh network. The media frame may have been processed utilizing a reception ring buffer, for example according to the method of FIG. 4. An identical entry corresponding to the received frame may be searched in the route ring buffer. Routing information may be derived from the received media frame, said routing information comprising a source node identifier, a target node identifier, a last node identifier and a frame identifier. If 501 an entry corresponding to the received frame is found the derived routing information may be stored 502 to the route ring buffer and the received media frame may be deleted 503. In this way a new entry may be added to the route ring buffer, whereby the route identified by the received frame may be found in the route ring buffer at least for the total length of the buffer before the entry is overwritten. Furthermore, since the received frame is deleted the received frame may be prevented from being forwarded. If 501 an entry corresponding to the received frame is not found, it is determined 504 whether the received frame is targeted to the node. The target node field in the received frame may be compared with the node's own identifier and if they match the received frame is targeted to the node. If 504 the received frame is targeted to the node, the received frame may be processed 505 by the node and e.g. forwarded to a recipient entity in the node. In one example the received frame may be forwarded to a service layer to be processed by a service layer protocol entity. If 504 the received frame is not targeted to the node, the method may proceed without processing the received frame in phase 505. After determining 504 whether the received media frame is targeted to the node, a reverse route for the received media frame may be determined 506 and the route ring buffer may be searched for the reverse route. If 506 the reverse route entry is found the method may proceed to 502 for preventing the received media frame from being forwarded. If 506 the reverse route entry is not found i.e. the route ring buffer does not comprise routing information corresponding to the reverse route, the derived routing information may be stored 507 into the route ring buffer and the received media frame may be forwarded 508 in the mesh network. The method may end 509 after the received media frame is forwarded or prevented from being forwarded.

Figure 6:
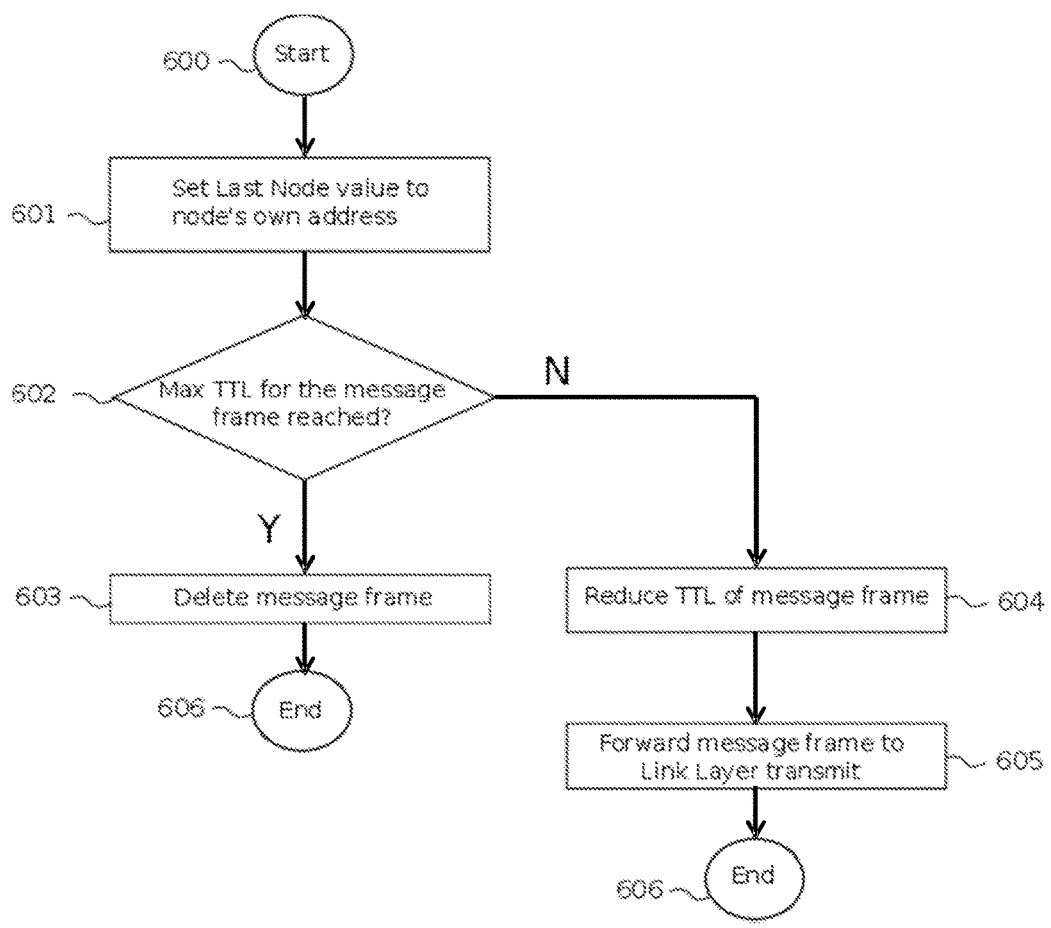
FIGS. 6 and 7 illustrate methods for transmitting a media frame in accordance with at least some embodiments of the present disclosure.
Figure 7:
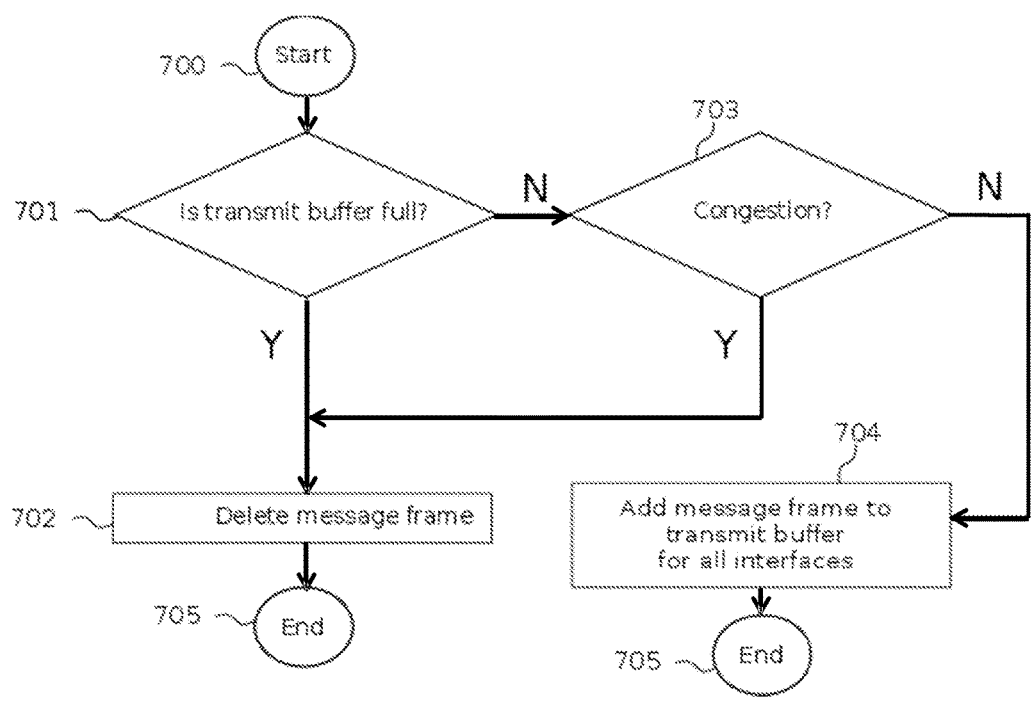

FIGS. 6 and 7 illustrate methods for transmitting a media frame in accordance with at least some embodiments of the present disclosure. The method of FIG. 6 provides that media frames are forwarded in the mesh network for a definite time, whereby only media frames that are sufficiently new may be forwarded in the mesh network and cause maintaining route ring buffers in the mesh network. The method of FIG. 7 provides that media frames are forwarded in the mesh network provided there are sufficient resources for transmission of the media frames. Referring to FIG. 6, the method may start 600, when a media frame has been generated for transmission from a transmitting node to a recipient node in the mesh network. The media frame may be generated by a service layer protocol or the media frame may be a received frame that is forwarded in the mesh network. A last node identifier in the media frame may be set 601 to the node's own identifier. If 602 a maximum time to live (TTL) of the media frame has been reached, the media frame may be deleted 603. If 602 a maximum TTL of the media frame has not been reached, the TTL of the media frame may be reduced 604 after which the media frame may be forwarded 605 in the mesh network. The method may end 606 after the media frame has been forwarded or deleted. Referring to FIG. 7, the method may start 700, when a media frame has been determined sufficiently new, for example according to the method of FIG. 6, to be forwarded in the mesh network. If 701 a transmit buffer is full, the media frame may be deleted 702. If 701 a transmit buffer is not full and if 703 there is congestion, the media frame may be deleted 702. If a transmit buffer is not full and if there is no congestion, the media frame may be added 704 to the transmit buffer. The transmit buffer may serve a plurality of interfaces that are all utilized for communications by nodes of the mesh network. Accordingly, the transmit buffer is common to all the interfaces. The method may end 705 after the media frame has been deleted or added to the transmit buffer.

Figure 8:
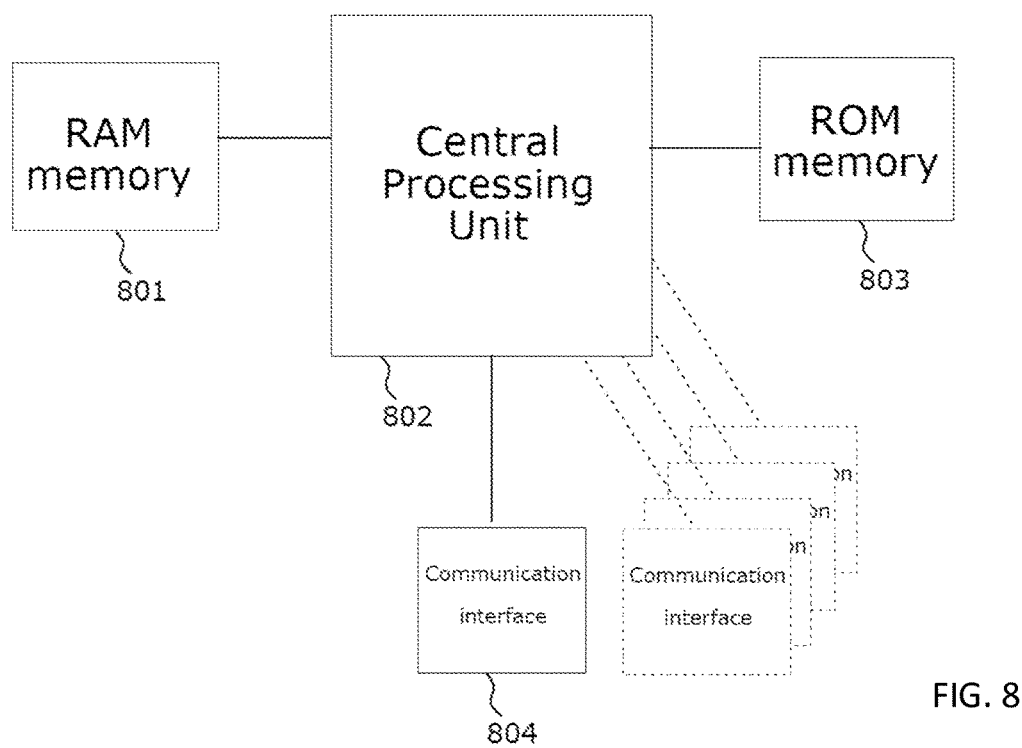
FIG. 8 illustrates an apparatus in accordance with at least some embodiments of the present disclosure.

FIG. 8 illustrates an apparatus in accordance with at least some embodiments of the present disclosure. The apparatus may be a node in a mesh network and caused to perform one or more functionalities according an embodiment. A node may be attached to the mesh network, and capable of creating, receiving, or transmitting media frames a communications channel. The apparatus may comprise a processor 802 and a memory 801, 803 and one or more communication interfaces 804. The processor may comprise one or more processing cores. The memory may be a non-transitory computer readable medium. The memory may store a computer program. The computer program may be executable by the processor to cause one or more functionalities described in the embodiments. In one example the processor and the memory may be operatively connected to the processor for communications of data for execution of the computer program by the processor. The connection between the processor and the memory may be a data bus for example. The communications interfaces may provide a communications channel for communications of media frames in the mesh network. Examples of the communications interfaces comprise network interface cards and network interface modules that may be connected to the apparatus by means of wired or wireless connections. Wireless connections may comprise Bluetooth and IEEE 802.11 based Wireless Local Area Network (WLAN) connections, for example. The wired connections may comprise data buses, for example.

An apparatus for example a node according to an embodiment may be at least capable of preventing a received media frame from being forwarded in the mesh network in accordance with the method in FIG. 2. Preventing an operation for example a forwarding operation may be achieved in one example by ignoring or omitting a forwarding operation, a forwarding command or a forwarding routine capable of causing a received frame being forwarded.

Figure 9A:
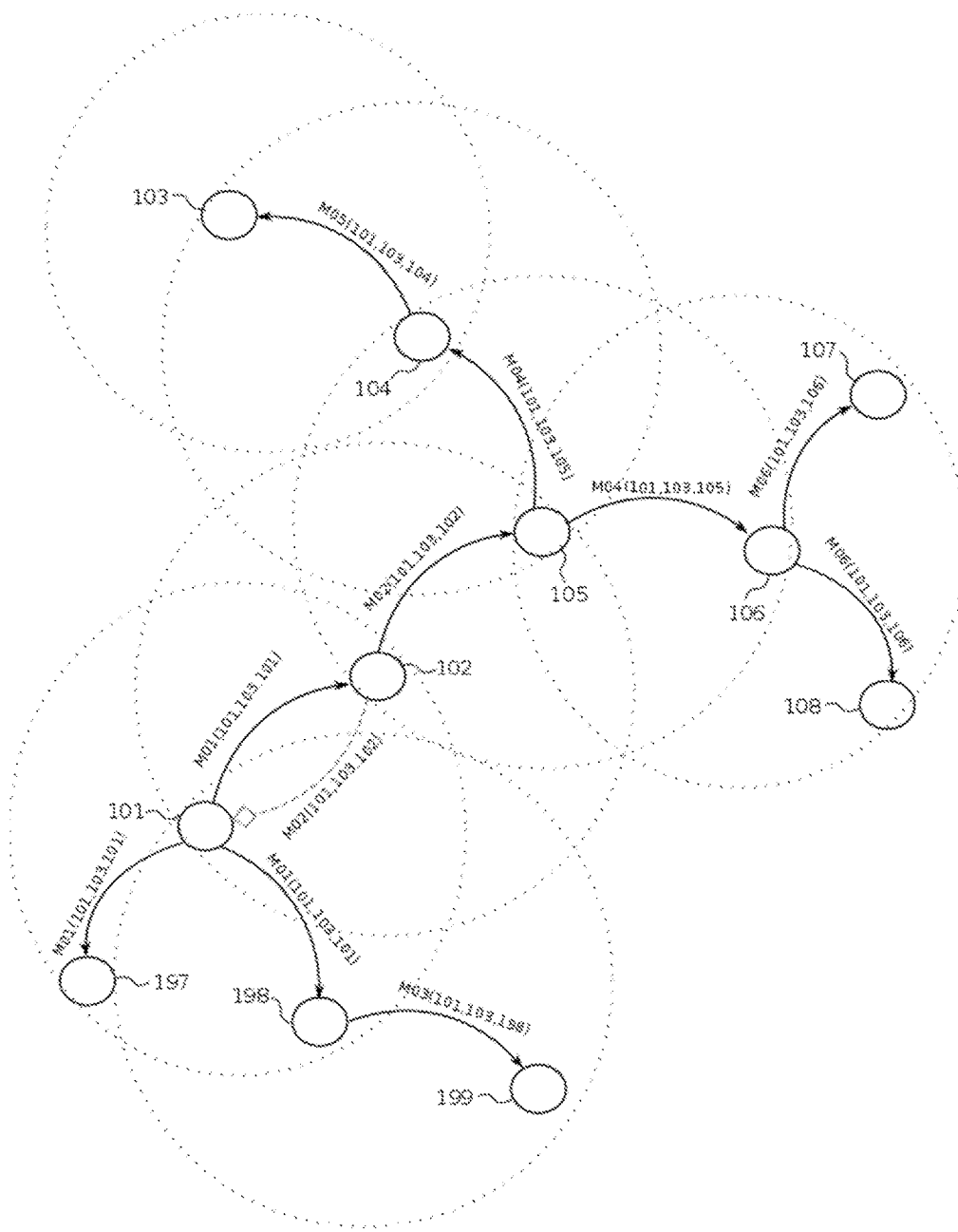
FIGS. 9a, 9b and 9c illustrate passive routing in a mesh network in accordance with at least some embodiments of the present disclosure.
Figure 9B:
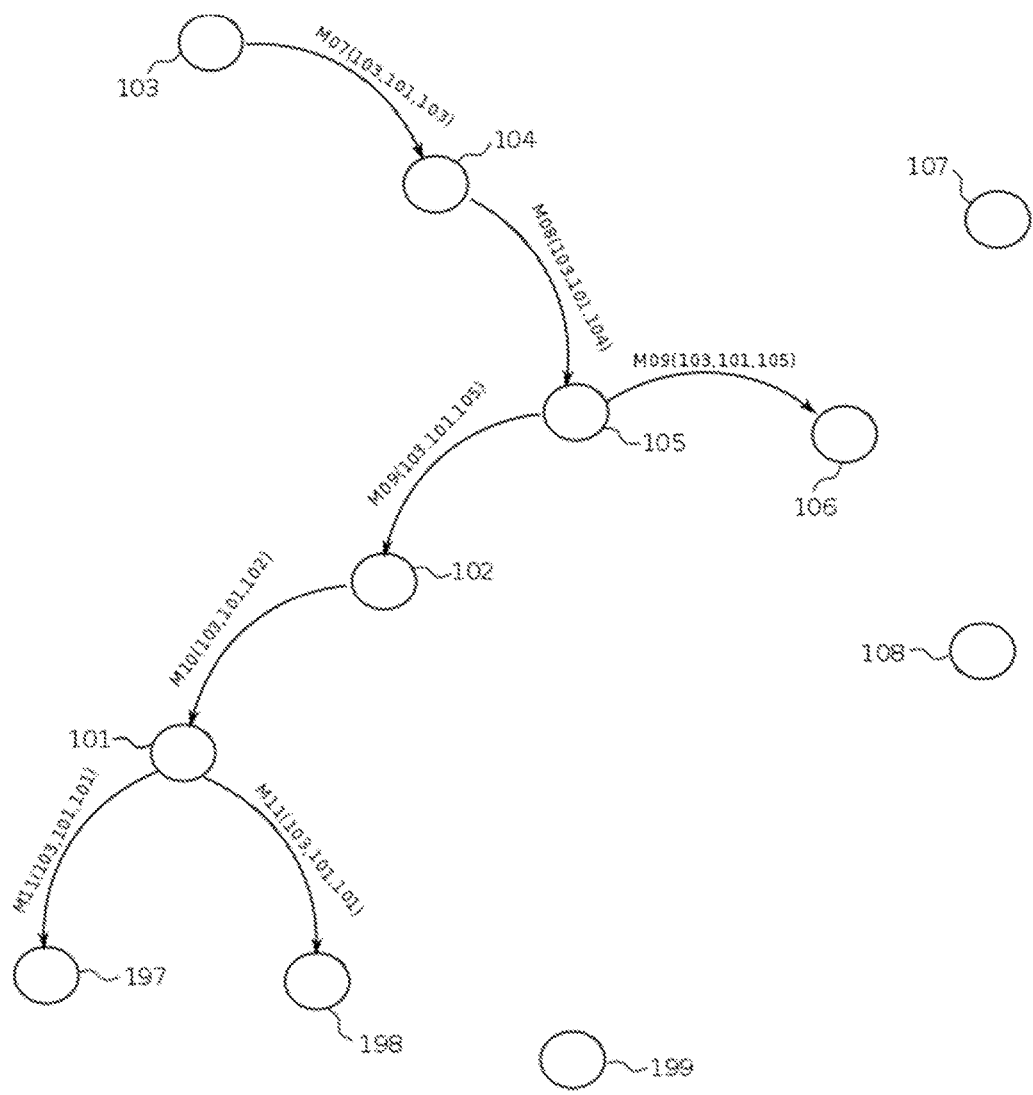
Figure 9C:
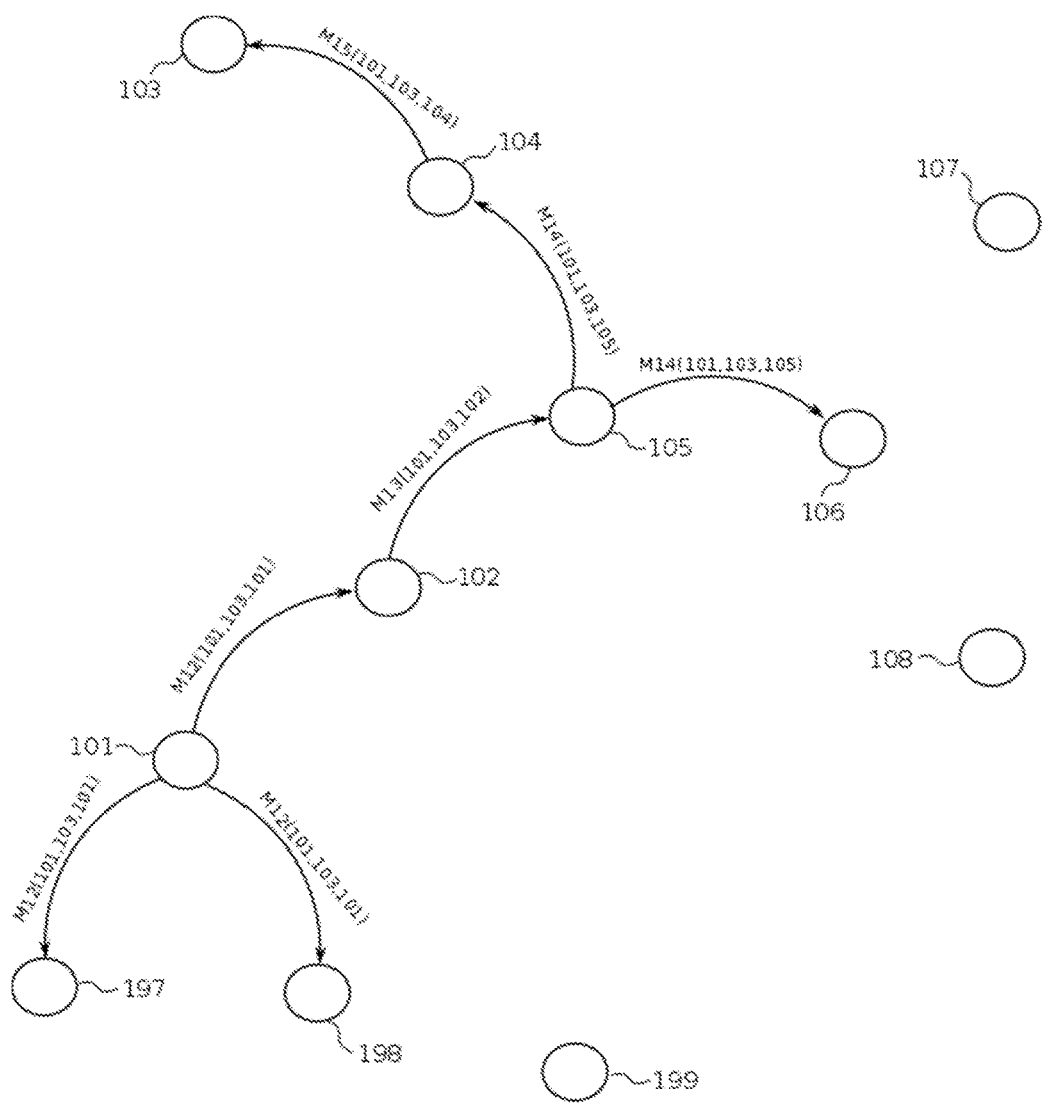

FIGS. 9a, 9b and 9c illustrate passive routing in a mesh network in accordance with at least some embodiments of the present disclosure. In passive routing, media frames are routed without separate messaging for maintaining routing tables. It should be appreciated that nodes of the mesh network may be preconfigured with information for creating media frames. The information for creating media frames may comprise network identification and a node identifier, for example. Also other information for setting one or more fields of media frames communicated in the mesh network may be preconfigured. The network identification may serve identifying a network address and the node identifier may serve for identifying the node as a source, target or last node of the media frame. In FIGS. 9a, 9b and 9c the passive routing is illustrated in a scenario, where initially all route ring buffers and reception ring buffers of the nodes may be empty. Accordingly, entries of the ring buffers may be populated starting from the first media frame communicated in the mesh network. A nodes in the mesh network may have a coverage area, where transmissions from the node may be received by another node. The coverage areas of the nodes are illustrated by dotted circles. In the passive routing illustrated in FIGS. 9a, 9b and 9c, media frames are described by messages between the nodes. A message may be denoted by Mxy (source node identifier, destination identifier, last node identifier), where M stands for message, x and y are digits for identifying the message, and the source node identifier, destination identifier and the last node identifier indicate values of the fields in the media frame.

In the passive routing illustrated in FIG. 9a, node 101 originates a first media frame addressed to node 103 that is forwarded in the mesh network in messages numbered consecutively from M01 to M06. In the passive routing illustrated in FIG. 9b, node 103, after receiving the first media frame from node 101, may originate a second media frame addressed to node 101 that is forwarded in the mesh network in messages numbered consecutively from M07 to M11. In the passive routing illustrated in FIG. 9c, node 101, after originating the first media frame to node 103 according to FIG. 9a and receiving a second media frame from node 103 according to FIG. 9b, may originate a third media frame addressed to node 103 that is forwarded in the mesh network in messages numbered consecutively from M12 to M15. A node originating a media frame is a source node of the media frame and the media frame may include the identifier of the source node, for example in a source node identifier field in accordance with FIG. 2.

It should be appreciated that media frames may be communicated independently from each other, whereby transmission of any media frame may be independent on whether another media frame is transmitted or received at any node in the mesh network. Accordingly, the order of media frames illustrated in FIGS. 9a, 9b and 9c is for helping to understand the described passive routing.

In the mesh network, a node that forwards a media frame may change a last node identifier of the media frame to be or to indicate its own identifier. This is in accordance with the method of FIG. 6 phase 601. It should be appreciated that payload of the media frame may be unchanged in the forwarding. One or more nodes, even all nodes, other than the source node may update routing information to a route ring buffer, for example as described in FIG. 5 phases 502 and 507. One or more nodes may update a reception ring buffer with duplicate media frame detection information as described for example in FIG. 4 phase 404.

First M01(101, 103, 101) is transmitted by node 101. M01 is received by nodes 102, 197 and 198 which are in the coverage area of the node 101. M01 may be considered as the first frame between nodes 101 and 103, since nodes in the mesh network do not have routing information for routing media frames between the nodes 101 and 103. Accordingly, node 102 stores no routing information for message M01, whereby the node 102 forwards the media frame M01 as M02(101, 103, 102). M02 is received by node 101 that is within the coverage area of the node 102. The node 101 may perform duplicate detection and determine that M02 is a duplicate for example according to the method described in FIG. 4. It should be appreciated that the message M02 received in node 101 is in the backward direction since the node 101 is the source node of the message M01. Therefore, node 101 may identify the M02 as a duplicate and delete the message in accordance with the phase 403 in FIG. 4. Therefore, in FIGS. 9a, 9b and 9c message M02 to node 101 and similar backward messages are left away from the example drawing and description.

One or more nodes within the coverage area may receive M01 and update a reception ring buffer with duplicate media frame detection information as described for example in FIG. 4 phase 404, and update routing information to a route ring buffer, for example as described in FIG. 5 phases 502 and 507. Since the buffers of the nodes may be initially empty, the media frame may be forwarded in messages M02 to M06 without being determined as duplicate, for example in phases 401, and without being prevented from forwarding, for example in phase 503. Since, buffers are initially empty, the media frame may be forwarded also to nodes 106, 107, 108 that are at a larger distance to the target node 103 than node 105. The distance may be measured for example by the number of link hops between nodes for communications of media frames. M02 to M06 may cause updating a reception ring buffer and update routing information similar to M01.

After the first media frame has been delivered to the target node 103 in messages M01 to M06, the second media frame may be sent in M07 from node 103 towards node 101. Messages M07 to M11 may be caused to update the reception ring buffers similar to the messages M01 to M06 described above. Also routing information may be updated in route ring buffers similar to the messages M01 to M06 described above. However, since the first media frame has been forwarded through the mesh network from node 101 to node 103, the route ring buffers of the nodes may have a reverse route or routing information at least in part corresponding to the reverse route of the second media frame.

In an embodiment, the routing information corresponding to the reverse route at least comprises the same last node identifier with the media frame, and a source node identifier corresponding to the target node identifier of the media frame. In this way reverse route may be determined without storing target node identifiers in route ring buffers. Accordingly, storing target node identifiers may be omitted for example in phases 502 and 507 in FIG. 5. In an example, the messages M01 to M06 comprise a source node identifier indicating node 101 and a target node identifier indicating node 103. Then, routing information corresponding to the reverse route for any of the messages M01 to M06 comprises the same last node identifier as in the message and a source node identifier indicating node 103.

In an embodiment, the routing information corresponding to the reverse route may further comprise a target node identifier corresponding to the source node identifier of the media frame. Accordingly, last node identifiers, source node identifiers and target node identifiers may be stored in phases 502 and 507 in FIG. 5 to route ring buffers for determining reverse routes. Since in addition to the source node identifier, also target node identifiers are stored to route ring buffers and used for determining reverse routes, a fewer number of frames may be prevented from being forwarded, whereby load of the network may be controlled. In an example, the messages M01 to M06 comprise a source node identifier indicating node 101 and a target node identifier indicating node 103. Then, routing information corresponding to the reverse route for any of the messages M01 to M06 comprise the same last node identifier as in the message, a source node identifier indicating node 103 and a target node identifier indicating node 101.

It should be appreciated that load of a specific part of the mesh network or specific nodes of the mesh network may be controlled by configuring a part of the mesh network nodes to store last node identifiers, source node identifiers and target node identifiers for determining reverse routes in accordance with the above embodiment. Another part, e.g. one or more nodes, of the mesh network may be configured to store last node identifiers and source node identifiers, without storing the target node identifiers for determining reverse routes, in accordance with the above embodiments. In this way both approaches for determining reverse routes may be applied in the mesh network.

It should be appreciated that, at least in some embodiments, a reverse route or routing information corresponding to the reverse route may comprise the same last node identifier with the media frame, and a source node identifier and a target node identifier that are switched with respect to the media frame. Accordingly, the routing information in the route ring buffer may comprise source node identifier of the node 101 and target node identifier of the node 103 that may be switched in the message such that the source node identifier in the message may be the identifier of node 103 and a target node identifier in the message may be the identifier of node 101.

Consequently, when a reverse route or routing information corresponding to the reverse route is found from the route ring buffer of the node, the received media frame is not sent forward from node 106 thus forming boundary to dynamic transmit route between nodes 101 and 103. Accordingly, the received media frame is prevented from being forwarded in the mesh network, in accordance with FIG. 5 phase 503. This is illustrated in FIG. 9b in nodes 106, 197 and 198, where reverse routes are found in the route ring buffers and the media frame is not forwarded by the nodes. In this way, the nodes 106, 197, 198 may serve as boundary nodes for routing media frames in the mesh network between nodes 101 and 103.

After the second media frame has been delivered to the node 101, the third and possible further media frames may be communicated from node 101 to node 103 using routing information stored in the route ring buffers of the nodes. Accordingly, the routing information stored in the route ring buffers may cause that a route is established for media frames between the nodes 101 and 103, such that media frames may be forwarded in the mesh network, for example as described in FIG. 5 phase 508. Route ring buffers in the nodes 106, 197 and 198 also store reverse route or routing information corresponding to the reverse route for media frames between nodes 101 and 103, whereby the media frames originating from node 101 to node 103 or vice versa may be prevented from being forwarded. Communications of media frames updates the route ring buffers and reception ring buffers in the nodes such that received media frames may be deleted 503 if it may be determined that the same frame has already been received, for example as described in phases 503 in FIG. 5.

In an example procedure of passive routing according to at least some embodiments, media frames may be processed at the nodes by a protocol stack comprising the following layers in a top down order: application, service, network, link and physical. The media frames may have the format described with FIG. 2. The nodes may have ring buffers according to FIGS. 3a and 3b. The link layer may be caused to execute one or more functionality described with the methods of FIG. 4 and FIG. 7. The network layer may be caused to execute one or more functionality described with the method of FIG. 5 and FIG. 6. Accordingly, at the source node 101, 103, a media frame may be caused by an application which gives to service layer as input target node identifier, service source identification, target node identifier and payload data. Then, a service layer may create the media frame with input from application and adds source node identifier, network address, domain address, unique message identifier and time-to-live (TTL) information. The created media frame is forwarded to network layer transmit. Next, the network layer may add the node's own identifier as last node identifier of media frame. If TTL has reached end, the media frame may be deleted. Otherwise, the TTL may be reduced and the media frame may be forwarded to link layer. In the link layer, media frame may be deleted if transmit buffer is full or congestion level is too high. Otherwise the media frame may be sent to transmit buffers of all physical interfaces.

Continuing with the example, one or more nodes of the mesh network which are within a coverage area of the transmitting node of the mesh network, may receive the media frame transmitted by the transmitting node. The received media frame may be received by a physical layer where network address and message integrity of the media frame may be checked. Then the received media frame may be processed on link layer, where it may be determined if an identical entry or corresponding entry in a reception ring buffer exists. In an example, an identical entry or corresponding entry may have a matching source node identifier, domain address and message identifier with the received media frame. If an identical entry or corresponding entry is found, the received media frame may be deleted. Otherwise new entry may be added to the reception ring buffer and the media frame may be forwarded to network layer.

Continuing with the example, in the network layer, it may be checked if an identical copy or a corresponding copy of the media frame is in a route ring buffer. In an example, an identical copy or corresponding copy may have a matching source node identifier, target node identifier, domain address and message identifier with the received media frame. If an identical copy or a corresponding copy is found, a new entry may be added to the route ring buffer and the media frame may be deleted. Then it may be checked if the media frame is targeted for the node. If yes, media frame may be forwarded to service layer. If media frame is for the node or not, the reverse route for the media frame is looked up from the route ring buffer. In an example, the reverse route may comprise an entry of the route ring buffer, where target node identifier and source node identifier are switched with respect to the received media frame, and the entry has the same last node identifier and domain address with the received media frame. It should be appreciated that it may be sufficient for the entry to store a source node identifier corresponding to the target node identifier of the received media frame and the same last node identifier for determining a reverse route. If the reverse route is found, new entry is added to the route ring buffer and the media frame is deleted. If reverse route is not found, new entry is added to the route ring buffer and message is forwarded to the network layer.

It is to be understood that the embodiments of the present disclosure are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though a member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the present disclosure.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosed embodiments. Accordingly, it is not intended that the present disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. A method for passive routing in a mesh network, the method comprising
   receiving, by a node of the mesh network, one or more media frames from source nodes to target nodes in the mesh network;
   deriving, by the node of the mesh network, routing information from a received media frame, said routing information comprising a source node identifier, a target node identifier, a last node identifier of a node that has sent the frame before the node of the mesh network and a frame identifier;
   storing, by the node of the mesh network, the derived routing information into a route ring buffer;
   determining, by the node of the mesh network, a reverse route for the received media frame;
   preventing the received media frame from being forwarded in the mesh network, when the route ring buffer comprises routing information corresponding to the reverse route, wherein said routing information corresponding to the reverse route at least comprises the same last node identifier with the last node identifier of the received media frame, and a source node identifier corresponding to the target node identifier of the received media frame.

2. A method according to claim 1, comprising: forwarding the received media frame in the mesh network, when the route ring buffer does not comprise routing information corresponding to the reverse route.

3. A method according to claim 2, comprising: setting the last node identifier in the media frame to comprise information capable of identifying the forwarding node.

4. A method according to claim 1: comprising: deleting the received media frame without forwarding the media frame, when the route ring buffer comprises routing information corresponding to the reverse route.

5. A method according to claim 1, wherein the routing information corresponding to the reverse route further comprises a target node identifier corresponding to the source node identifier of the media frame.

6. A method according to claim 1, wherein, at a target node, a copy of the received media frame is forwarded to service layer, and the received media frame is forwarded in the mesh network, when a route ring buffer at the target node does not comprise routing information corresponding to the reverse route.

7. A method according to claim 1, comprising:
   performing duplicate media frame detection for the received media frames, when a received media frame is not a duplicate the route ring buffer is updated.

8. A method according to claim 7, wherein the duplicate media frame detection comprises:
   deriving from the received media frames duplicate media frame detection information comprising one or more of: a source node identifier, a domain identifier, a frame identifier;
   storing the derived duplicate media frame detection information into a reception ring buffer;
   determining whether a received media frame is a duplicate on the basis of the duplicate media frame detection information stored in the reception ring buffer;
   when received media frame is a duplicate, the received media frame is deleted without updating the route ring buffer.

9. A method according to claim 1, wherein a plurality of physical layer interfaces are applied for communications in the mesh network, whereby a media frame is transmitted via the physical layer interfaces when a threshold value for duplicate messages in a reception ring buffer is not met for the media frame.

10. A method according to claim 1, wherein the target node identifier, the source node identifier, the frame identifier and a hop limiter of the received media frame are set by a service protocol layer and utilized together with a network protocol layer and a link protocol layer by a node in the mesh network.

11. An apparatus comprising at least one processing core, at least one memory including computer program code, the at least one memory and the computer program code being configured to, with the at least one processing core, cause the apparatus at least to perform a method comprising:
 receiving, by a node of the mesh network, one or more media frames from source nodes to target nodes in the mesh network;
 deriving, by the node of the mesh network, routing information from a received media frame, said routing information comprising a source node identifier, a target node identifier, a last node identifier of a node that has sent the frame before the node of the mesh network and a frame identifier;
 storing, by the node of the mesh network, the derived routing information into a route ring buffer;
 determining, by the node of the mesh network, a reverse route for the received media frame;
 preventing the received media frame from being forwarded in the mesh network, when the route ring buffer comprises routing information corresponding to the reverse route, wherein said routing information corresponding to the reverse route at least comprises the same last node identifier with the last node identifier of the received media frame, and a source node identifier corresponding to the target node identifier of the received media frame.

12. A non-transitory computer readable medium having stored thereon a set of computer readable instructions that, when executed by at least one processor, cause a node of the mesh network to at least:
 receive, by the node of the mesh network, one or more media frames from source nodes to target nodes in the mesh network;
 derive, by the node of the mesh network, routing information from a received media frame, said routing information comprising a source node identifier, a target node identifier, a last node identifier of a node that has sent the frame before the node of the mesh network and a frame identifier;
 store, by the node of the mesh network, the derived routing information into a route ring buffer;
 determine, by the node of the mesh network, a reverse route for the received media frame;
 prevent the received media frame from being forwarded in the mesh network, when the route ring buffer comprises routing information corresponding to the reverse route, wherein said routing information corresponding to the reverse route at least comprises the same last node identifier with the last node identifier of the received media frame, and a source node identifier corresponding to the target node identifier of the received media frame.

* * * * *